AIRCRAFT AUTOMATIC FLIGHT CONTROL SYSTEM

Filed Feb. 7, 1955 2 Sheets-Sheet 1

INVENTORS.
GEORGE MUINCH, JR.,
RICHARD A. ROCHE,
FREDERICK L. GAGNON, JR.,
BY Henry Heyman
ATTORNEY.

$g_i = g \sin γ$
$g_v = g \cos γ$

INVENTORS,
GEORGE MUINCH, JR.,
RICHARD A. ROCHE,
FREDERICK L. GAGNON, JR.,
BY Henry Hyman
ATTORNEY.

United States Patent Office 2,881,991 Patented Apr. 14, 1959

2,881,991

AIRCRAFT AUTOMATIC FLIGHT CONTROL SYSTEM

Richard A. Roche, Downey, George Muinch, Jr., Culver City, and Frederick L. Gagnon, Jr., Hawthorne, Calif., assignors to Hughes Aircraft Company, Culver City, Calif., a corporation of Delaware Application February 7, 1955, Serial No. 486,750

7 Claims. (Cl. 244—77)

This invention relates to apparatus for automatically controlling the flight of an aircraft and more particularly to an apparatus incorporating a lift-type control system for directing an aircraft along a desired course in response to signals representative of the error therefrom.

In present day electronic fire control systems for aircraft, the pilot is generally given information for directing his aircraft along an attack course through the means of a visual display of the error from a desired course. In one instance this error is displayed by the position of an "error dot" with respect to a set of reference coordinates, the zero position on which is representative of the desired course. In utilizing a system of this type, the pilot attempts to fly the aircraft so that the error dot appears at the zero position. A radar fire control system of this type is shown and described in a copending application for patent Serial No. 426,956, entitled, "Rocket Launch Control Systems," filed by H. R. Kaiser, J. H. Irving, G. F. Floyd, and R. H. Mettler on May 3, 1954. Use of this type of radar equipment has shown that it is not always possible for a pilot to accurately sense the movement of his aircraft and compensate the controls accordingly or to respond with sufficient rapidity to changes in course. Consequently, it is generally deemed desirable to provide apparatus capable of ascertaining the dynamic state of the aircraft and for automatically compensating the controls to fly the aircraft along the attack course. It is recognized that this problem is analogous to that which exists for automatic bombing and automatic landing systems.

The basic difficulty in automatic flight control systems, is to employ a suitable primary control parameter that lends itself to the maintenance of stable flight conditions. In one present day system under development, the angle of attack is used as a primary control parameter. This system is particularly adapted to automatic landing systems where little altitude is available for recovering from stalls resulting from overcontrol. A disadvantage of this system, however, is that improved methods are required for measuring the angle of attack, particularly at high speeds. With respect to other systems, it is noted that a lateral control system using only lateral deviations from the desired course is basically unstable, some control proportional to the rate of change of deviation from the desired course being necessary to effect stability. For complete control, it is also necessary to eliminate vertical deviations from the desired course. Thus, in addition to having two control systems, it is necessary to integrate the operation of the lateral control system with that of a vertical control system.

In accordance with the present invention, a roll-stabilized automatic flight control system is provided wherein the primary control parameter is based upon the radial acceleration, i.e., the lift acceleration, of the aircraft which produces a rate of change with time of attitude angle. More particularly, the radial acceleration of the aircraft, when flying at a predetermined roll angle, is made proportional to the lateral deviation from a desired course. The optimum flight attitude of the aircraft for changing course to the desired direction is used to determine the roll angle. Additional stability is added to the control system of the present invention by counteracting dynamics of the control system and aircraft by adding a "quick-indication" component to the control signal. This quick-indication component takes the rate-of-change with time of the lateral deviation and the time rate of this rate-of-change of lateral deviation into consideration. Also, in addition to the foregoing, cross-coupling is provided between the roll and the pitch controls in a manner to maintain the effect of the roll control signal in a predetermined relationship with respect to the pitch control signal.

It is therefore an object of this invention to provide an improved apparatus employing radial acceleration as a primary control parameter for flying an aircraft along a desired course in response to signals representative of the deviation therefrom.

Another object of the present invention is to provide an apparatus for automatically controlling the flight of an aircraft wherein the radial acceleration of the aircraft is utilized as a basic control parameter.

Still another object of the present invention is to provide an apparatus for automatically controlling the flight of an aircraft incorporating a quick-indication signal to counteract the effect of the time constant of the system dynamics.

A further object of the present invention is to provide an apparatus for automatically controlling the flight of an aircraft wherein the pitch control signal is employed to affect the amplitude of the roll-control signal in a manner to maintain the relationship between the "controlling-effect" of the signals substantially constant.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

Figure 2:
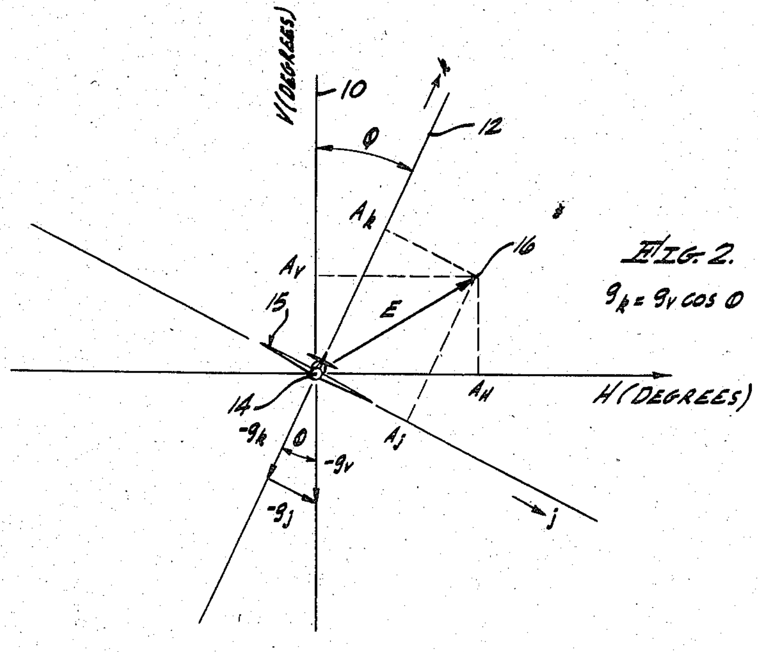
Figs. 2 and 3 are coordinate systems employed in the device of the present invention on which are shown parameters indicating the attitude and flight conditions of the aircraft.

In order to simplify the description of the apparatus constituting the device of the present invention, it is first necessary to show the relationship between the radial acceleration of the aircraft and its dynamics in the development of the roll and pitch control signals. Referring now to Fig. 2 there is shown a roll-stabilized coordinate system 10 and a space coordinate system 12. Thus there are two dimensional coordinate systems which are disposed in a common plane which is normal to the longitudinal axis of the aircraft. Both coordinate systems 10 and 12 have a common origin 14 at the intersection of the common plane with the longitudinal axis of the aircraft.

More particularly, the roll-stabilized coordinate system 10 comprises a horizontal reference coordinate H and a reference coordinate V which is normal to the longitudinal axis of the aircraft and to the horizontal reference coordinate H. Both the H and V coordinates are graduated in degrees.

From the above, it is noted that the V coordinate always appears in a vertical position in a plan view of the H coordinate. The space coordinate system 12, on the other hand, "rolls" with the attitude of the aircraft. In this respect, the coordinate system 12 comprises a reference coordinate $j$ which extends normal to the longitudinal axis of the aircraft along the plane of the wings and a reference coordinate $k$ which is normal to the longitudinal axis of the aircraft and to the $j$ coordinate. In accordance with the above, an end view of an aircraft 15 is shown illustrating its relative position with respect to the two coordinate systems. The angle between the $j$—$k$ and H—V coordinate systems 10 and 12 is designated as the roll angle of the aircraft 15 and is denoted by $\phi$.

The magnitude of the angular error or deviation component from the desired course together with its direction is represented by the vector E which extends from the origin 14 to a point 16 which indicates the desired heading of the aircraft. The components of the vector E on the H and V coordinates of the roll-stabilized coordinate system 10 are $A_H$ and $A_V$, respectively, and on the $j$ and $k$ coordinates of the space-stabilized system 12 $A_j$ and $A_k$, respectively. The transformational relationship between $A_j$, $A_k$ and $A_H$, $A_V$ may be written as follows:

$$A_j=A_H \cos \phi-A_V \sin \phi \qquad \text{Equation 1}$$
$$A_k=A_H \sin \phi+A_V \cos \phi \qquad \text{Equation 2}$$

It is apparent from the above definitions that $A_j$ and $A_k$ represent the angle off course in the $j$ and $k$ directions, respectively. The angle off course in the $j$ direction, i.e., $A_j$ will generally be referred to as the lateral deviation from the desired course.

Figure 3:
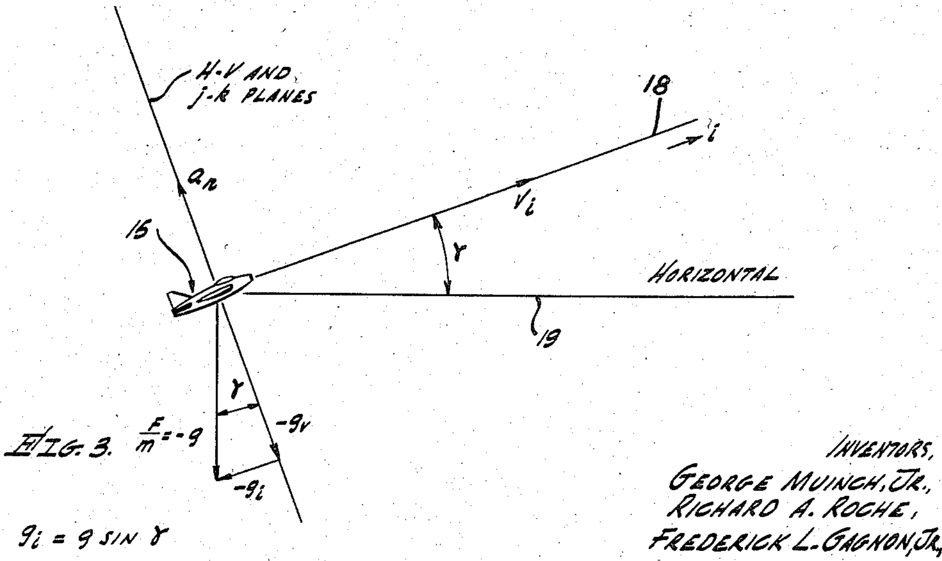

Referring to Fig. 3, there is shown a side view of the space-stabilized coordinate system 12 shown in Fig. 2. In this view, the roll-stabilized coordinate system 10 and space-stabilized coordinate system 12 appear as a line 18. The longitudinal axis of the aircraft is designated as the $i$ coordinate, the positive direction along this coordinate being in the direction in which the aircraft is moving. The angle representing the pitch attitude of the aircraft from an H direction viewpoint is designated as $\gamma$ and is the angle which the $i$ coordinate makes with a horizontal line 19. The velocity of the aircraft is assumed to be constant and is represented by the vector $V_i$ which lies along the $i$ coordinate. A radial acceleration of the aircraft produces a change with respect to time in the attitude angle, $\gamma$. Thus, by differentiating the vector $V_i$ with respect to time, it may be shown that the radial acceleration, $a_r$, of the aircraft is:

$$a_r=V_i\omega_\gamma \qquad \text{Equation 3}$$

wherein $\omega_\gamma$ is the angular velocity of the vector $V_i$ and is equal to $2\pi$ times the rate of change of $\gamma$ with respect to time $$\left(\omega_\gamma=2\pi\frac{d\gamma}{dt}\right) \qquad \text{Equation 4}$$

For $V_i$ rotating in the counter-clockwise direction, the radial acceleration, $a_r$, will lie along the positive $k$ coordinate as indicated in the drawing.

In addition to the parameters designating the dynamics of the aircraft, it is also necessary to consider the forces on the aircraft due to gravity. In this respect, it is more convenient to treat these forces in terms of unit of mass, so that the resulting equations will be independent of the loading of the aircraft. Force per unit of mass is, of course, synonymous with acceleration. The downward force per unit of mass on the aircraft due to gravitational acceleration is designated as $-g$, where $$-g=\frac{F}{m}$$

F being the force and $m$ the mass of the aircraft. In that this force is downward, it is negative to conform with the coordinate systems of Fig. 2. Upon resolving the downward acceleration, $-g$, into components along the V and $i$ coordinates, the component of acceleration along the V coordinate is designated as $-g_v$, and the component along the $i$ coordinate is designated as $-g_i$. It may be shown that:

$$g_v=g \cos \gamma \qquad \text{Equation 5}$$
$$g_i=g \sin \gamma \qquad \text{Equation 6}$$

Also, the component of acceleration due to gravity along the $k$ coordinate, designated as $-g_k$, may be shown to be:

$$g_k=g_v \cos \phi \qquad \text{Equation 7}$$

Using the equivalent for $g_v$ as given in Equation 5, Equation 7 becomes:

$$g_k=g \cos \phi \cos \gamma \qquad \text{Equation 8}$$

This latter expression is a measure of the wing loading per unit of mass due to gravitational acceleration. Thus, if $a_{LD}$ is designated as the desired total measure of wing loading per unit of mass, then from Equations 3 and 8, it is apparent that:

$$\omega_\gamma=\frac{a_{LD}-g \cos \gamma \cos \phi}{V_i} \qquad \text{Equation 9}$$

wherein the quantity $(a_{LD}-g \cos \gamma \cos \phi)$ is equivalent to the desired radial acceleration $a_r$.

In accordance with the present invention, the lateral deviation from the desired course, $A_k$, is made proportional to the rate of change with respect to time of the attitude angle, $\gamma$. Thus, $$A_k=K'\dot{\gamma}=K'\frac{360}{2\pi}\omega_\gamma \qquad \text{Equation 10}$$

whence from Equation 9

$$A_k=K_1(a_{LD}-g \cos \gamma \cos \phi) \qquad \text{Equation 11}$$

wherein K' is a constant of proportionality and $$K_1=360K'/2\pi V_i$$

In actual operation, it has been found that $\gamma$ is generally less than 10 degrees. This situation makes it possible to approximate $$\cos \gamma \doteq 1$$

whereby $$A_k=K_1(a_{LD}-g \cos \phi) \qquad \text{Equation 12}$$

From Equation 12, the desired lift or acceleration is:

$$a_{LD}=KA_k+g \cos \phi \qquad \text{Equation 13}$$

wherein $$K=\frac{1}{K_1}$$

Thus, if $a_L$ is designated as the actual acceleration as measured by a lift accelerometer, the error in lift acceleration, $\delta_{LIFT}$, becomes:

$$\delta_{LIFT}=a_{LD}-a_L=KA_k+g \cos \phi-a_L \qquad \text{Equation 14}$$

This latter Equation 14 for the error in lift acceleration is developed and employed as the control signal for determining the pitch attitude of the aircraft. It may be seen to be comprised of the product of a predetermined constant K multiplied by the pitch deviation of the attitude of the aircraft from the desired course ($A_k$, as in Equation 2 above) added to the radial acceleration of the aircraft due to gravity ($g \cos \phi$), and with the actual wing loading ($A_1$) subtracted.

In addition to the above, it is recognized as desirable for the aircraft to return on course in the minimum possible time consistent with stability of flight. Inasmuch as the magnitude of the roll angle is indicative of the rate at which the aircraft will turn, the roll angle is employed as the primary control parameter for preventing the aircraft from deviating laterally from the desired course. Due to the characteristics of the control loop formed by the radar fire control system, however, lateral control of the aircraft is inherently unstable when only the lateral course error is employed as the roll control signal. In order to maintain stable flight, it is necessary to take the dynamic characteristics of the aircraft into consideration. For example, if the roll angle were directly proportional to the lateral deviation, the situation could arise where the aircraft had zero roll angle but had considerable angular velocity about its longitudinal axis. This condition, if undamped, is obviously not consistent with stable flight as the control signal would be zero even though the inertia of the aircraft would soon produce an error in the roll angle. Hence, it is apparent that a portion of the roll control signal should take the rotational velocity of the aircraft into consideration. Since a rate of change of roll angle towards its zero position is a negative quantity, the corrective signal representative of the time-rate of change of roll angle should be added to the basic signal that is proportional to lateral deviation.

Furthermore, it is also desirable to take any time-rate of change of the angular velocity about the longitudinal axis into account. For example, the magnitude of the compensation necessary would obviously be different to correct for a particular roll velocity that was increasing or decreasing. Since it is only desired to stabilize the roll attitude of the aircraft, any rate-of-change in the roll velocity with time due to a change in the heading of the aircraft need not be considered. Accordingly, in the device of the present invention, the magnitude of the roll control signal, $\delta'_a$, is made proportional to the sum of the aforementioned quantities, namely:

$$\delta_a' = A_j + \tau \dot{A}_j + \kappa_0 \frac{\partial'}{\partial t}(\dot{A}_j) \quad \text{Equation 15}$$

where $\delta'_a$ is the roll control signal;

$A_j$ is the angle off course along the $j$ coordinate;

$\dot{A}_j$ is the rate of change of $A_j$ with respect to time; and $\frac{\partial}{\partial t}(\dot{A}_j)$ is the second partial derivative of $A_j$ with respect to time with reference to the roll-stabilized coordinate system.

The partial derivative of $\dot{A}_j$ is used to signify that the relative position of the aircraft with respect to the desired course is held constant, thus making $\dot{A}_H$ and $\dot{A}_V$ equal to zero, where $\dot{A}_H$ and $\dot{A}_V$ are the time rate-of-change of $A_H$ and $A_V$. $\tau$ and $\kappa_0$ are constants which are determined by the dynamics of the aircraft. In the above Equation 15, the latter two terms, i.e., $\tau\dot{A}_j$ and $$\kappa_0 \frac{\partial}{\partial t}(\dot{A}_j)$$

increase or decrease the value of $A_j$ to give an equivalent or effective angle off course along the $j$ coordinate with zero angular velocity and acceleration. For this reason, the terms $\tau\dot{A}_j$ and $$\kappa_0 \frac{\partial}{\partial t}(\dot{A}_j)$$

are known as the "quick-indication" components of the control signal. It is to be noted that these components are produced solely by the motion of the aircraft and not by any absolute change in the direction of the desired course due, for example, to a change in position of the target. In order to simplify the apparatus for deriving $\delta'_a$, the terms on the right side of Equation 15 may be reduced to quantities that are more readily available. More particularly, with regard to the term $\tau\dot{A}_j$, we may commence by differentiating $A_j$ in terms of $A_H$, $A_V$ and $\phi$ as given by Equation 1, that is:

$$A_j = A_H \cos\phi - A_V \sin\phi \quad \text{Equation 1}$$

$$\dot{A}_j = [\dot{A}_H \cos\phi - \dot{A}_V \sin\phi] - [A_H \sin\phi + A_V \cos\phi]\dot{\phi} \quad \text{Equation 16}$$

Noting that from Equation 2, $$A_H \sin\phi + A_V \cos\phi = A_k$$

Equation 16 reduces to:

$$\dot{A}_j = \dot{A}_H \cos\phi - \dot{A}_V \sin\phi - A_k\dot{\phi} \quad \text{Equation 17}$$

To simplify the quantity $[\dot{A}_H \cos\phi - \dot{A}_V \sin\phi]$, it is recognized that the only way to obtain a rate of change of error along the $j$ coordinate for a constant roll angle, $\phi$, and constant velocity, $V_i$, is by the acceleration due to gravity along that axis, i.e., $g_j = g \sin\phi$. This by analogy with Equation 3

$$\frac{2\pi}{360}\frac{\partial A_j}{\partial t} = \frac{-g \sin\phi}{V_i} \quad \text{Equation 18}$$

where $\frac{\partial A_j}{\partial t}$ is rate-of-change of the angle off course along the $j$ coordinate with respect to time in degrees per second for a constant roll angle and is equal to the quantity $[\dot{A}_H \cos\phi - \dot{A}_V \sin\phi]$ Thus, Equation 18 becomes:

$$[\dot{A}_H \cos\phi - \dot{A}_V \sin\phi] = -\frac{360}{2V_i\pi} g \sin\phi = -gK_2 \sin\phi$$

where $V_i$ is defined above and Equation 17 reduces to:

$$\dot{A}_j = -gK_2 \sin\phi - A_k\dot{\phi} \quad \text{Equation 19}$$

The term $\tau\dot{A}_j$ may be represented as:

$$\tau\dot{A}_j = -gK_2\tau \sin\phi - \tau A_k\dot{\phi} \quad \text{Equation 20}$$

In order to reduce the last term in Equation 15 i.e., the partial derivative of $\dot{A}_j$ with respect to time with reference to the roll-stabilized coordinate system 10, to a more readily available quantity, Equation 19 may be employed. Taking the partial derivative with respect to time of $\dot{A}_j$ as set forth in Equation 19

$$\frac{\partial \dot{A}_j}{\partial t} = -gK_2 \cos\phi\dot{\phi} - \dot{A}_k\dot{\phi} - A_k\ddot{\phi} \quad \text{Equation 21}$$

In actual practice the roll angle, $\phi$, is generally sufficiently small to enable the approximation of $\cos\phi = 1$ to be made in this equation. Also, the rate of change of the off course angle along the $k$ coordinate, $\dot{A}_k$, and the roll acceleration, $\ddot{\phi}$, make the latter two terms negligible in comparison to the first term. Thus, $$\kappa_0\frac{\partial \dot{A}_j}{\partial t} \doteq -gK_2\kappa_0\dot{\phi} = -\kappa\dot{\phi} \quad \text{Equation 22}$$

Substituting Equations 20 and 22 in Equation 15, the roll control signal, $\delta'_a$, becomes:

$$\delta'_a = A_j - \tau A_k\dot{\phi} - (gK_2\tau)\sin\phi - \kappa\dot{\phi} \quad \text{Equation 23}$$

wherein $\kappa = gK_2\kappa_0$

Figure 1:
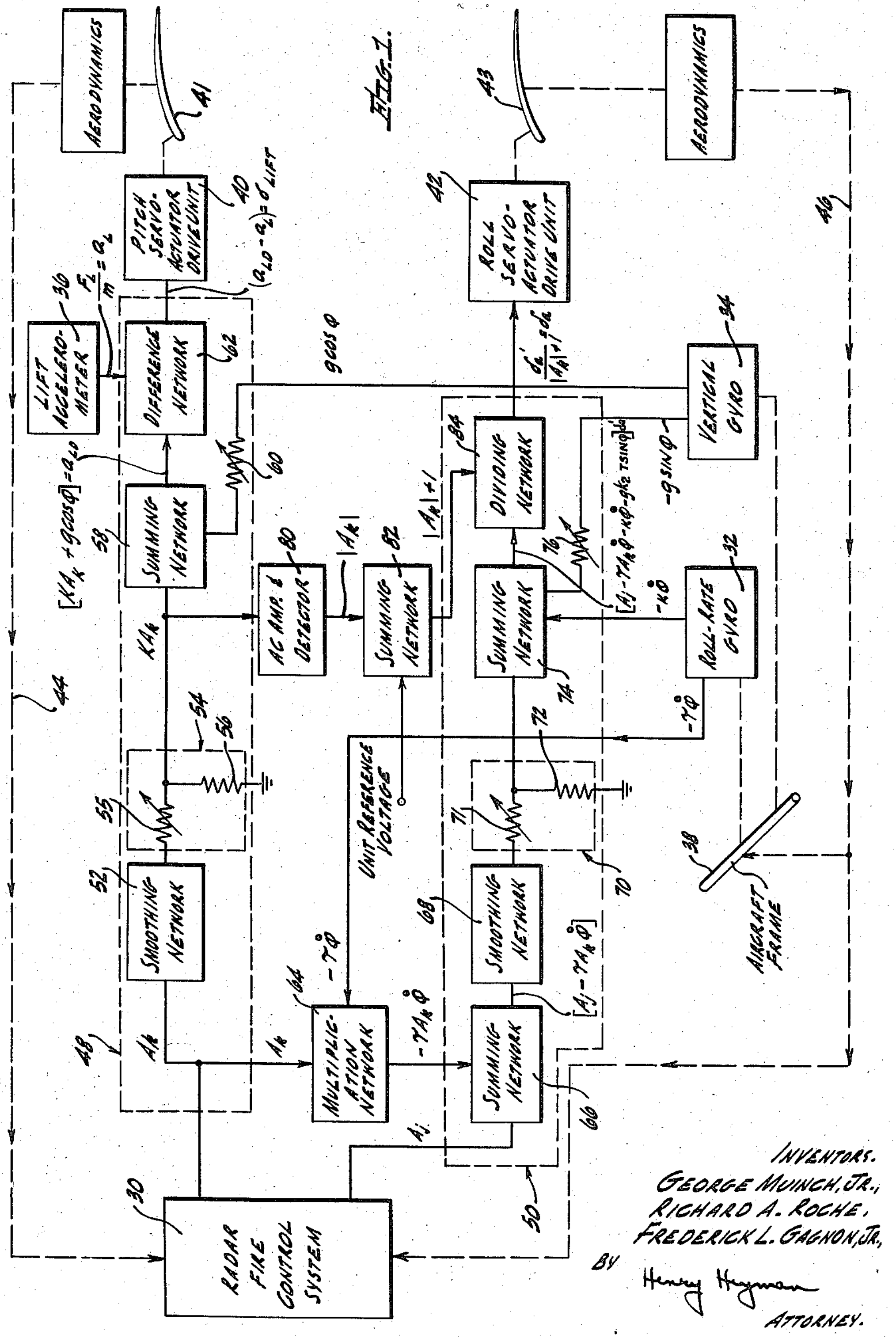
Fig. 1 is a schematic block diagram showing the manner in which the control signals are developed in the device of the present invention.

The pitch and roll control signals as defined by Equations 14 and 23 respectively, are derived by the apparatus constituting the device of the present invention as illustrated in Fig. 1. Referring to this figure, a radar fire control system 30 provides space-stabilized 500 cycle per second error signals $A_j$ and $A_k$ representative of the lateral and pitch deviation, respectively, of the present direction of the aircraft from a desired attack course. Signals $A_j$ and $A_k$ are scaled to represent the pitch or lateral deviation in degrees. In addition to the error signals provided by radar system 30, the device of the present invention also requires signals provided by a roll-rate gyro 32, a vertical gyro 34 and a lift accelerometer 36. The roll-rate gyro 32 and vertical gyro 34 are responsive to the roll velocity and attitude of the aircraft, respectively, by means of mechanical connections to the aircraft frame 38 as indicated by dashed lines. More particularly, the roll-rate gyro 32 provides two signals representative of the roll-rate, $\dot{\phi}$, namely, $-\tau\dot{\phi}$ and $\kappa\dot{\phi}$ where $\tau$ and $\kappa$ are determined by the dynamic characteristics of the aircraft; the vertical gyro 34 resolves a signal, $g$, representative of the downward acceleration of gravity, into quadrature components along the $j$ and $k$ coordinates of the space-stabilized coordinate system 12, namely, $-g \sin \phi$ and $g \cos \phi$, respectively. The lift accelerometer 36, on the other hand, provides a signal, $a_L$, representative of the actual wing loading of the aircraft. This signal, $a_L$, is the actual force per unit mass, i.e., acceleration, on the aircraft and includes the radial acceleration of the aircraft as well as the component of gravitational force normal to its wings.

The device of the present invention, in response to the signals provided by the radar fire control system 30, the roll-rate gyro 32, the vertical gyro 34, and the lift accelerometer 36, develops the signals $\delta_{LIFT}$ and $\delta'_a$ in accordance with Equations 14 and 23, respectively. These equations are as follows:

$$\delta_{LIFT}=a_{LD}-a_L=KA_k+g \cos \phi-a_L \qquad \text{Equation 14}$$

$$\delta'_a=A_j-\tau A_k\dot{\phi}-(gK_2\tau) \sin \phi-\kappa\dot{\phi} \qquad \text{Equation 23}$$

The signals $\delta_{LIFT}$ and $\delta'_a$ are used to control pitch and roll servo-actuator drive units 40 and 42, respectively, which in turn actuate the appropriate surfaces 41, 43 as indicated by the dashed lines for controlling the pitch angle, $\gamma$, and the roll angle, $\phi$, of the aircraft. This change in attitude is effected in accordance with the aerodynamics of the aircraft and is sensed by the radar fire control system 30, as represented by linkage lines 44 and 46, coupled to the control surface 41, 43 and to the aircraft frame 38, thereby forming, in effect, a closed-loop control system. The radar fire control system 30, in response to the change in attitude of the aircraft or change in the position of the target, produces a corresponding change in the off course error signals $A_k$ and $A_j$ which are in turn employed to control the flight of aircraft along the desired attack course.

More particularly, the lift acceleration and roll control signals, $\delta_{LIFT}$, $\delta'_a$, are developed in two separate channels, as indicated by dashed lines 48 and 50, respectively. The pitch and roll control channels 48 and 50 are initially responsive to the off course error components $A_k$ and $A_j$, respectively, which are produced by the radar fire control system 30. The magnitude of the error signals $A_k$, $A_j$ are representative of the angular deviation in degrees from a desired attack course for the aircraft.

Considering now the pitch control channel 48, the off course error signal, $A_k$, provided by the radar system 30 is impressed through a smoothing network 52 upon the input of a scale factor network 54. The purpose of the smoothing network 52 is to prevent any abrupt or momentary changes in the course of the aircraft due to scintillation noise originating in the fire control system 30 or other disturbance on the signal, $A_k$. After being smoothed, the scale factor network 54 reduces the magnitude of the signal, $A_k$ by the scale factor K, thus providing an output signal, $KA_k$. Scale factor network 54 may comprise, for example, a variable resistor 55 connected in series with the signal path and having its output terminal shunted to ground by a resistor 56 of suitable resistance to provide for the scale factor reduction.

The output signal, $KA_k$, of the scale factor network 54 together with the $g \cos \phi$ signal produced by the vertical gyro 34 are both impressed on a summing network 58 which provides an output signal representative of the sum of the input signals, namely, $[KA_k+g \cos \phi]$. Thus the output of the summing network 58 is comprised of the product of a predetermined constant multiplied by the pitch deviation of the attitude of the aircraft from the desired course added to the radial acceleration of the aircraft due to gravity. The scale factor of the $g \cos \phi$ signal is adjusted by means of a variable resistor 60 inserted in the lead from the vertical gyro 34 to the summing network 58. From an inspection of Equation 13, it is noted that the quantity $[KA_k+g \cos \phi]$ is equal to the desired lift or acceleration, $a_{LD}$. Thus, the output signal from the summing network 58 is a signal representative of the desired lift acceleration, $a_{LD}$, and accordingly may be impressed upon a difference network 62 along with the signal $a_L$, provided by the lift accelerometer 36 and representative of the actual lift acceleration, to produce the signal, $\delta_{LIFT}$, representative of the pitch deviation. This signal, as previously mentioned, is used to control the pitch servo-actuator drive unit 40 to actuate the control surface 41 in a manner to correct the error in the pitch angle, $\gamma$, of the aircraft.

Considering now the roll control channel 50, a multiplication network 64 receives the signal, $A_k$, representative of the off course error in pitch from the pitch control channel 48 and the signal, $-\tau\dot{\phi}$, from the roll-rate gyro 32 to produce an output signal equal to their product, namely, $-\tau A_k\dot{\phi}$. The signal, $A_j$, from the radar fire control system 30 together with the output signal, $-\tau A_k\dot{\phi}$, from the multiplication network 64 are impressed upon the input terminals of a summing network 66 to produce a signal representative of their sum, namely $[A_j-\tau A_k\dot{\phi}]$. This signal quantity is then impressed through a smoothing network 68 upon the input terminal of a scale factor network 70 which may comprise, for example, a variable resistor 71 connected in series with the signal path and a resistor 72 connected from its output terminal to ground. The purpose of the scale factor network 70 is to provide a means of setting the level of the signal quantity, $[A_j-\tau A_k\dot{\phi}]$.

The signal quantity $[A_j-\tau A_k\dot{\phi}]$ from the output of the scale factor network 70 is then impressed upon the input of a summing network 74 along with the $-\kappa\dot{\phi}$ signal produced by the roll-rate gyro 32 and the $-g \sin \phi$ signal provided by the vertical gyro 34. A variable resistor 76 is inserted in the lead from the vertical gyro 34 to the summing network 74 to provide a scale factor adjustment of the $-g \sin \phi$ signal thereby to produce a signal representative of $-gK_2\tau \sin \phi$. The summing network 74 produces a signal quantity having a magnitude equal to the sum of its input signals, i.e., $$[A_j-\tau A_k\dot{\phi}-\kappa\dot{\phi}-gK_2\tau \sin \phi]$$

Comparing this quantity with Equation 23, it is seen that it is equal to the desired roll control error signal, $\delta'_a$.

Before impressing this signal directly on the roll servo-actuator drive unit 42, it is desirable to take the non-linearity of the effect of the roll control surfaces into consideration for variations in the pitch of the aircraft. That is, a larger pitch angle, $\gamma$, enhances the controlling effect of the aileron surfaces in controlling the roll angle $\phi$. In addition, it is also desirable to keep the roll angle small in instances where the lateral deviation is large for stability purposes. In accordance with the present invention, the roll control signal is decreased in amplitude when the pitch control signal is large by cross-coupling a signal representative of the error in the pitch attitude of the aircraft from the pitch control channel 48 to the roll control channel 50. In the present case this is accomplished by connecting the signal, $KA_k$, appearing between the scale factor network 54 and the summing network 58 to the input of an alternating current amplifier and detector 80 which converts the signal to a quantity $|A_k|$ representative of its absolute value. This signal quantity together with a unity reference voltage is impressed upon the input terminals of a summing network 82 to provide a signal representative of the quantity $|A_k|+1$.

This signal, $|A_k|+1$, is then divided into the roll control signal, $$(A_j-\tau A_k\dot{\phi}-\kappa\dot{\phi}-gK_2\tau \sin \phi)=\delta'a$$

to decrease its amplitude in direct relation with the magnitude of the $A_k$ signal. The presence of the unity reference voltage never allows the divisor to become less than unity so as not to allow the magnitude of the roll control signal to be increased. Accordingly, both signals are impressed upon the input terminals of a dividing network 84 to produce a composite roll control signal, $\delta_a$, where $$\delta_a=\frac{[A_j-\tau A_k\dot{\phi}-\kappa\dot{\phi}-gK_2\tau \sin \phi]}{|A_k|+1}=\frac{\delta_a'}{|A_k|+1}$$

This composite roll control signal $\delta_a$ is then applied to the roll servo-actuator drive unit 42 to actuate the aileron surfaces and thus control the roll angle of the aircraft.

What is claimed is:

1. A device for automatically controlling the flight of an aircraft along a desired course in response to signals representative of the pitch and lateral deviation of the attitude of the aircraft from the desired course, said device comprising a source for producing signals representative of the pitch and lateral deviation of said aircraft from said desired course, first means including a vertical gyro for producing a first signal representative of the gravitational acceleration times the cosine of the roll angle of said aircraft; second means coupled to said source and to first means for adding the signal representative of pitch deviation and said first signal to produce a signal representative of the desired wing loading per unit mass of said aircraft; third means including a lift accelerometer for producing a signal representative of the actual wing loading per unit mass of said aircraft; fourth means coupled to said second and third means for producing a control signal representative of the difference in the magnitudes of said desired and said actual wing loading per unit mass of said aircraft; and fifth means coupled to said fourth means and responsive to said control signal for changing the pitch angle of said aircraft to decrease the pitch deviation of the attitude of said aircraft from said desired course.

2. The device for automatically controlling the flight of an aircraft as defined in claim 1 which additionally includes sixth means for producing an additional control signal representative of the sum of the lateral deviation of the attitude of said aircraft from said desired course, a constant, $\tau$, times the rate of change of said lateral deviation, and a constant, $\kappa_0$, times the partial derivative with respect to time of this rate of change of lateral deviation, wherein the constants $\tau$ and $\kappa_0$ are determined by the dynamics of the aircraft; and means coupled to said sixth means and responsive to said additional control signal for effecting changes in the roll attitude of said aircraft.

3. A device for automatically controlling the flight of an aircraft along a desired course in response to signals $A_k$ and $A_j$ made available by a source disposed on board said aircraft and representative, respectively, of the pitch and lateral deviation of the attitude of the aircraft from the desired course, said device comprising first means including a vertical gyro for producing signals representative of $g \cos \phi$ and $-g \sin \phi$, wherein $g$ is the gravitational acceleration and $\phi$ is the roll angle of said aircraft; second means coupled to said source and to said first means and including a summing network for adding a predetermined portion of the signal $A_k$ to said signal $g \cos \phi$ to produce a signal representative of the desired wing loading per unit mass of said aircraft; third means including a lift accelerometer for producing a signal representative of the actual wing loading per unit mass of said aircraft; fourth means coupled to said second and third means for producing a control signal representative of the difference in the magnitudes of said desired and said actual wing loading per unit mass of said aircraft; and fifth means coupled to said fourth means and responsive to said control signal for changing the pitch angle of said aircraft in a direction to decrease the pitch deviation of the attitude of said aircraft towards said desired course.

4. A device for automatically controlling the flight of an aircraft as defined in claim 3 which additionally includes sixth means including a roll-rate gyro for producing signals $-\tau\dot{\phi}$ and $-\kappa\dot{\phi}$, wherein $\tau$ and $\kappa$ are constants determined by the dynamics of the aircraft and $\dot{\phi}$ is the rate-of-change of the roll angle of the aircraft; a multiplication network coupled to said source and to said sixth means and responsive to the signals $A_k$ and $-\tau\dot{\phi}$ for producing a signal $-\tau A_k\dot{\phi}$; a summing network coupled to said source and to said multiplication network and responsive to signals $A_j$ and $-\tau A_k\dot{\phi}$ for producing a signal representative of a quantity $[A_j-\tau A_k\dot{\phi}]$; an additional summing network coupled to said summing network, to said sixth means, and to said first means for adding the signals $[A_j-\tau A_k\dot{\phi}]$, $-\kappa\dot{\phi}$, and a predetermined portion of $-g \sin \phi$ for producing a roll control signal; and means responsive to said roll control signal for effecting corresponding changes in the roll attitude of the aircraft.

5. A device for automatically flying an aircraft along a desired course in response to signals representative of the pitch and lateral deviation of the attitude of the aircraft from the desired course, said device comprising first means for producing a first signal representative of the desired wing loading per unit mass of said aircraft, said first signal being comprised of the product of a predetermined constant multiplied by the pitch deviation of the attitude of said aircraft from siad desired course added to the radial acceleration of said aircraft due to gravity; second means for producing a second signal representative of the actual wing loading per unit mass of said aircraft; third means coupled to said first and second means for producing a third signal representative of the difference between said first and second signals, said third signal constituting a control signal representative of the difference in the magnitudes of said desired and said actual wind loading per unit mass of said aircraft; and fourth means coupled to said third means and responsive to said control signal for changing the pitch angle of said aircraft to decrease the pitch deviation of the attitude of said aircraft towards said desired course.

6. The device for flying an aircraft along a desired course as defined in claim 5 which includes a fifth means responsive to said signal representative of lateral deviation for producing an additional control signal; and means coupled to said fifth means and responsive to said additional control signal for controlling the roll attitude of said aircraft.

7. The device for flying an aircraft along a desired course as defined in claim 6 including additional means responsive to said signal representative of pitch deviation and coupled to said fifth means for decreasing the magnitude of said additional control signal in accordance with the magnitude of said signal representative of pitch deviation.

References Cited in the file of this patent

UNITED STATES PATENTS

| | | |
|---|---|---|
| 1,997,412 | Fischel | Apr. 9, 1935 |
| 2,595,309 | Slater | May 6, 1952 |
| 2,627,384 | Esval | Feb. 3, 1953 |